United States Patent
Kato et al.

[11] Patent Number: 5,852,285
[45] Date of Patent: Dec. 22, 1998

[54] HONEYCOMB HEATER WITH PARALLEL CIRCUITS

[75] Inventors: Yasushi Kato, Handa, Japan; Shigeharu Hashimoto, Farmington Hills, Mich.

[73] Assignee: NGK Insulators, Ltd., Japan

[21] Appl. No.: 726,220

[22] Filed: Oct. 4, 1996

[30] Foreign Application Priority Data

Oct. 13, 1995 [JP] Japan .................................. 7-265258

[51] Int. Cl.⁶ .................................................. H05B 3/02
[52] U.S. Cl. ...................... 219/553; 219/543; 219/528; 219/529
[58] Field of Search ............................ 219/552, 553, 219/542, 543, 528, 529

[56] References Cited

U.S. PATENT DOCUMENTS

| | | | |
|---|---|---|---|
| 4,223,209 | 9/1980 | Diaz | 219/549 |
| 5,063,029 | 11/1991 | Mizuno et al. | 422/175 |
| 5,202,547 | 4/1993 | Abe et al. | 219/552 |
| 5,399,841 | 3/1995 | Abe et al. | 219/552 |
| 5,446,264 | 8/1995 | Kondo | 219/528 |
| 5,614,155 | 3/1997 | Abe | 219/552 |

FOREIGN PATENT DOCUMENTS

| | | |
|---|---|---|
| 465184 | 1/1992 | European Pat. Off. . |
| 485179 | 5/1992 | European Pat. Off. . |
| 0 661 097 A1 | 7/1993 | European Pat. Off. . |
| 638710 | 2/1995 | European Pat. Off. . |
| 661097 | 7/1995 | European Pat. Off. . |
| 661421 | 7/1995 | European Pat. Off. . |
| 0 735 797 A1 | 10/1996 | European Pat. Off. . |
| 89/10471 | 11/1989 | WIPO . |

*Primary Examiner*—Teresa J. Walberg
*Assistant Examiner*—Quan Nguyen
*Attorney, Agent, or Firm*—Parkhurst & Wendel

[57] ABSTRACT

A honeycomb heater includes a honeycomb structure made of an electroconductive material having slits for resistance adjustment and electrodes fitted thereto for electrification thereof. The slits are formed in the honeycomb structure in such a manner that parallel electric circuits are formed in the honeycomb structure upon electrification of the structure. This honeycomb heater with slits has a low resistance and excellent durability to repeated electrification, and is suitable for use with a battery.

5 Claims, 5 Drawing Sheets

F I G. 1 (A)
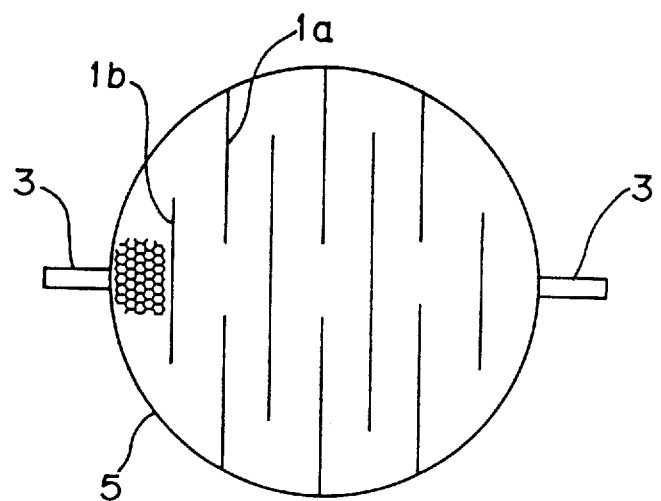
F I G. 1 (B)
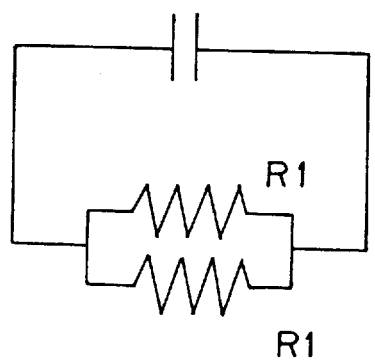

ered in part of a conventional honeycomb heater.

HONEYCOMB HEATER WITH PARALLEL CIRCUITS

BACKGROUND OF THE INVENTION

(1) Field of the Invention

The present invention relates to an electrically heatable honeycomb heater suitably used for the purification of automobile exhaust gas, etc.

(2) Description of the Prior Art

A technique is known in which when a catalytic convertor is used in automobiles, etc. for purification of the exhaust gas emitted therefrom, an electrically heatable heater is used, in combination with the catalytic convertor, to heat the convertor to its operating temperature as quickly as possible.

There is known, as such a heater, a so-called honeycomb heater comprising a honeycomb structure made of an electroconductive material and electrodes fitted thereto for electrification thereof. In this honeycomb heater, slits are generally formed in the honeycomb structure for adjustment of the amount of heat generated in the structure. For example, as shown in FIG. 6, slits 1 are formed in a honeycomb structure 5 in such a manner that they extend alternately from the opposing two halves of the circumference of the honeycomb structure 5, divided by a virtual plane including electrodes 3; thereby, the length of flow path of electricity in the honeycomb structure 5 is set appropriately to adjust the electric resistance of the honeycomb structure 5 and achieve heat generation of intended amount.

In using such a honeycomb heater in an automobile for the purification of the exhaust gas emitted therefrom, there is used, as the electric source of the honeycomb heater, an alternator or a battery. When a battery is used, it is impossible to allow the honeycomb heater to have a resistance higher than a certain level owing to the limitation of electric power to be consumed. In this case, therefore, the number of slits formed in the honeycomb structure is small; the distance between adjacent slits is large; and the number of cells between adjacent slits, i.e. the number of cells (passages) present in the shortest distance between adjacent slits is large.

A large number of cells between adjacent slits invites current concentration in the vicinity of each slit end of honeycomb structure; consequently, the vicinity comes to have a higher temperature than other portions of the honeycomb structure and problems such as cell rupture and the like tend to occur. Therefore, conventional low-resistance type honeycomb heaters with slits have had a problem of low durability to repeated electrification.

OBJECT AND SUMMARY OF THE INVENTION

The present invention has been made in view of the above-mentioned problems of the prior art. The main object of the present invention is to provide a low-resistance honeycomb heater with slits, which has excellent durability to repeated electrification and which can be suitably used with a battery.

According to the present invention, there is provided a honeycomb heater comprising a honeycomb structure made of an electroconductive material and electrodes fitted thereto for electrification thereof, wherein slits for resistance adjustment are formed in the honeycomb structure in such a manner that parallel electric circuits are formed in the honeycomb structure upon electrification of the structure.

BRIEF DESCRIPTION OF THE DRAWINGS

FIG. 1(A) is a drawing showing an example of the honeycomb heater according to the present invention.

FIG. 1(B) is a circuit drawing when the honeycomb heater is connected to a battery.

DETAILED DESCRIPTION OF THE INVENTION

Figure 7:
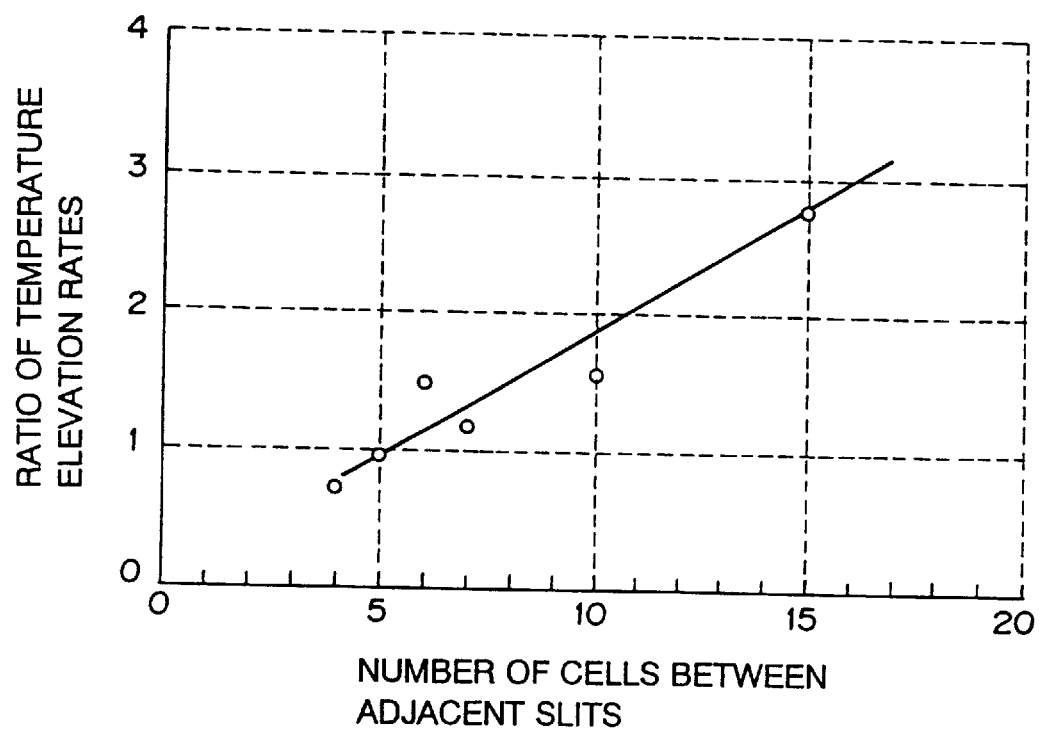
FIG. 7 is a graph showing the result of a study made on the relation between the number of cells between adjacent slits and the ratio of temperature elevation rates.
Figure 8:
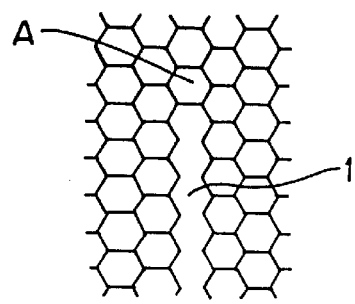
FIG. 8 is a drawing showing the position at which the temperature elevation rate of slit end was measured.

In a honeycomb heater with slits formed in the honeycomb structure, the current concentration occurring in the vicinity of each slit end of the honeycomb structure can be effectively relaxed by decreasing the number of slits between adjacent slits and increasing the number of slits formed in the honeycomb structure. A relation between the number of cells between adjacent slits and the ratio of temperature elevation rates defined below was examined in a honeycomb heater with slits, produced using a honeycomb structure (cell shape=hexagonal, cell density=450 cells/in.$^2$, rib thickness=4 mil) made of an electroconductive material, and the results are shown in FIG. 7. The ratio of temperature elevation rates is a value calculated from the following formula, using the temperature elevation rate at slit end and the temperature elevation rate at honeycomb structure center both measured for 5 seconds from the start of electrification of honeycomb heater at 2.0 kW (an electric power supplied to the honeycomb structure). The temperature elevation rate at slit end was measured at the cell A contacting with the end of slit 1, shown in the partially enlarged view of FIG. 8.

> Ratio of temperature elevation rates=(temperature elevation rate at slit end)/ (temperature elevation rate at honeycomb structure center)

Figure 6:
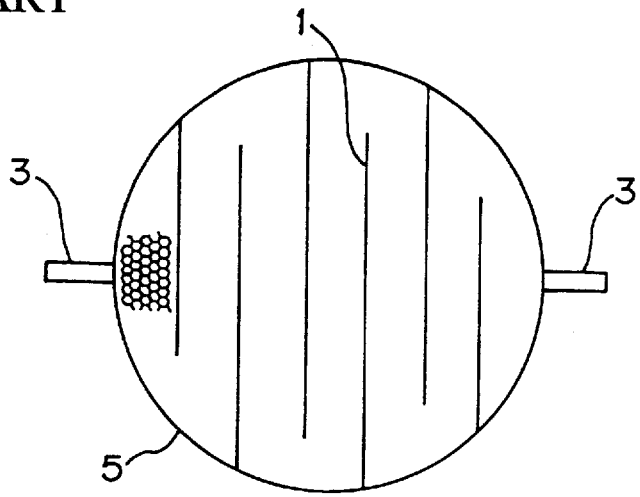
FIG. 6 is a drawing showing a conventional honeycomb heater.

It is appreciated from FIG. 7 that as the number of cells between adjacent slits is smaller, the ratio of temperature elevation rates is smaller, that is, current concentration in the vicinity of slit end is relaxed more. In conventional honeycomb heaters with slits, such as shown in FIG. 6, however, decrease in number of cells between adjacent slits and increase in number of slits formed results in longer flow path of electricity in honeycomb structure and consequent higher resistance, making such a honeycomb heater unusable with a battery in automobiles. Hence, in the present invention, slits were formed in the honeycomb structure of a honeycomb heater so that parallel circuits are formed in the honeycomb structure.

In parallel circuits, the sum of reciprocal numbers of resistances of individual circuits becomes the reciprocal number of total resistance. Therefore, in the present invention, even when the number of cells between adjacent slits is decreased and the flow path of electricity in each circuit is made long, the total resistance of honeycomb structure can be kept relatively low. Hence, in the present honeycomb heater, the number of cells between adjacent slits can be made small while the total resistance is made small so as to be used with a battery in automobiles, and current concentration in the vicinity of each slit end can be relaxed; thus, the present honeycomb heater has excellent durability to repeated electrification.

In one example of the honeycomb heater of the present invention, slits each with one end reaching the circumference of the honeycomb structure and other end not reaching the circumference of the honeycomb structure and slits each with both ends not reaching the circumference of the honeycomb structure are made in combination to form parallel electric circuits in the honeycomb structure. FIG. 1(A) shows such an example. In this example, in a honeycomb structure 5 provided with electrodes 3 for electricity supply, there are alternately formed a slit 1a with one end reaching the circumference of the honeycomb structure and other end not reaching the circumference and a slit 1b with both ends not reaching the circumference.

In this example, as seen in FIG. 1(B) which is a circuit drawing when such a honeycomb heater is connected to a battery, two circuits are formed in the honeycomb structure. When the resistance of each circuit is taken as R1, the total resistance of the honeycomb structure becomes half of the resistance R1 of each circuit based on the calculation made using the following formula.

$$R=1/(1/R1+1/R1)=R1/2$$

Figure 2:
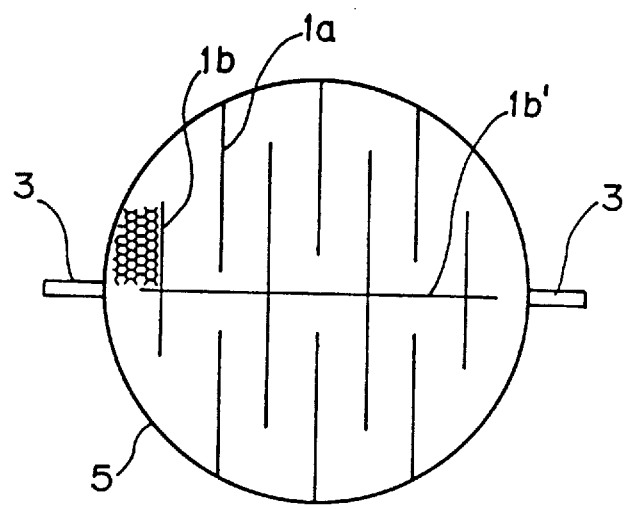
FIG. 2 is a drawing showing an example of the honeycomb heater according to the present invention.

FIG. 2 shows another example of the present honeycomb heater, wherein a slit 1b' is formed, in addition to the slits shown in FIG. 1, so as to intersect slits 1b. In the present honeycomb heater, the number of circuits formed in the honeycomb structure is not restricted to 2 as in FIG. 2 and FIG. 3 and may be larger.

Figure 3:
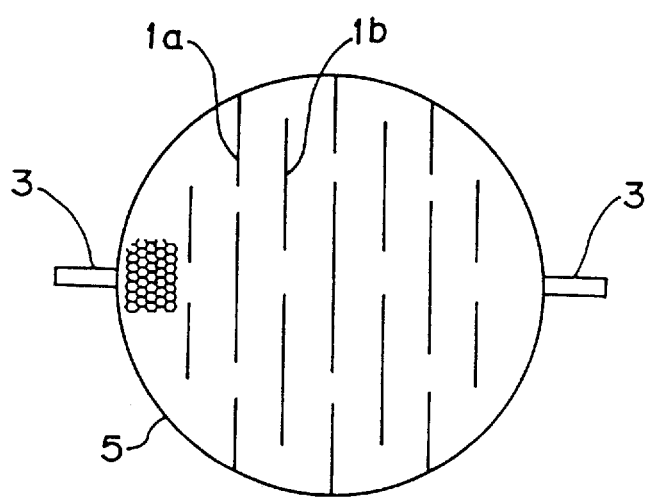
FIG. 3 is a drawing showing an example of the honeycomb heater according to the present invention.

For example, in the present honeycomb heater of FIG. 3, three circuits are formed in the honeycomb structure 5 by a combination of slits 1a each with one end reaching the circumference of the honeycomb structure and other end not reaching the circumference and slits 1b each with both ends not reaching the circumference. This honeycomb heater can have an even smaller resistance than the present honeycomb heaters each having two circuits.

Figure 4:
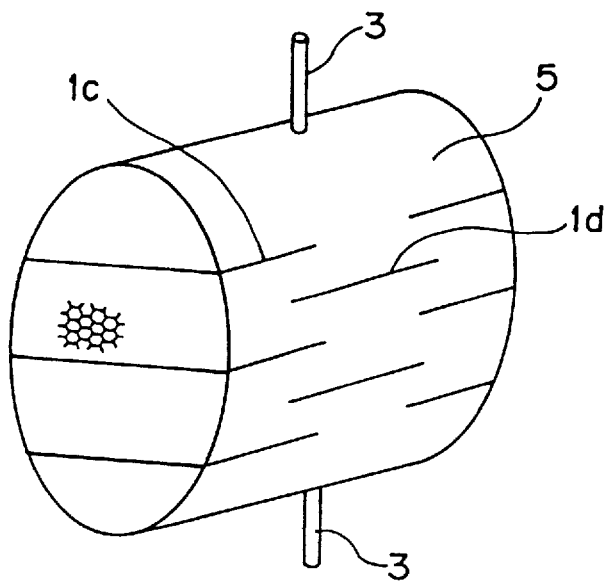
FIG. 4 is a drawing showing an example of the honeycomb heater according to the present invention.
Figure 5:
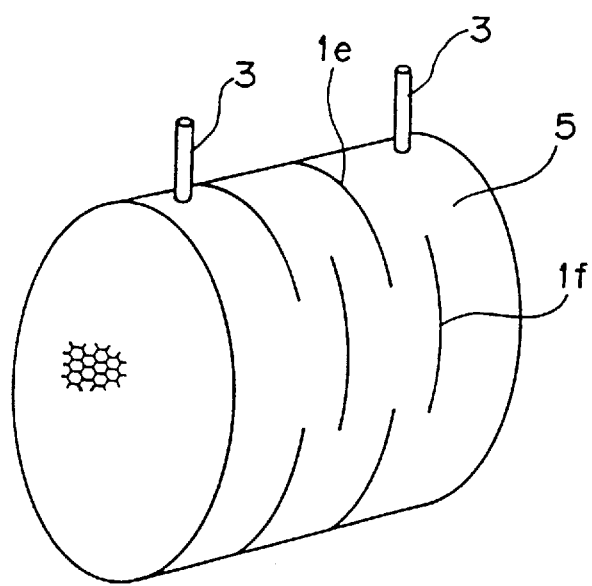
FIG. 5 is a drawing showing an example of the honeycomb heater according to the present invention.

Parallel circuits can also be formed in the honeycomb structure of the present honeycomb heater by forming slits in directions shown in FIG. 4 or 5. FIG. 4 is an example of the present honeycomb heater wherein slits are formed substantially in parallel to the cell axial direction and where two circuits are formed in the honeycomb structure 5 by a combination of slits 1c each with one end reaching the end of the structure and other end not reaching the end of the structure and slits 1d each with both ends not reaching the end of the structure.

FIG. 5 is an example of the present honeycomb heater where slits are formed substantially perpendicularly to the cell axial direction and where two circuits are formed in the honeycomb structure 5 by a combination of slits 1e each with one end reaching the circumference of the structure and other end not reaching the circumference of the structure and slits 1f each with both ends not reaching the circumference of the structure. When slits are formed in such a direction, the above-mentioned concept of "number of cells between adjacent slits" is not applicable; however, by forming the slits in the same direction, the distance between adjacent slits can be made small as compared with the case of a honeycomb heater having the same total resistance and having only one circuit in the honeycomb structure, whereby current concentration in the vicinity of each slit end can be relaxed.

Figure 9:
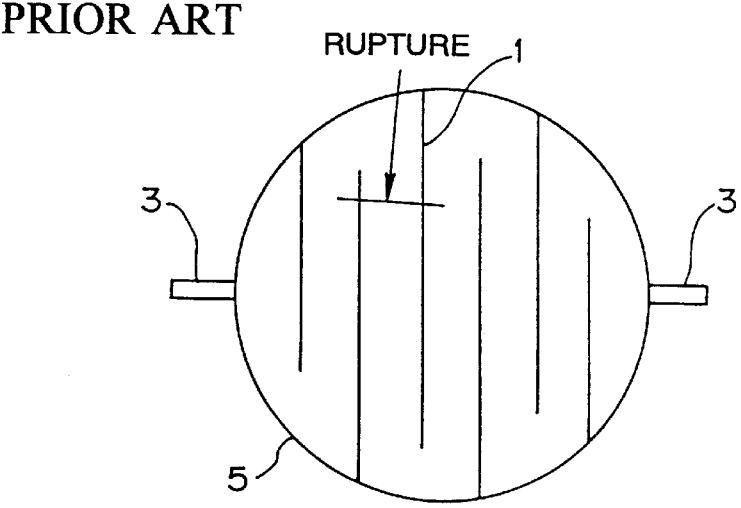
FIG. 9 is a drawing showing a state in which rupture has occurred in part of a conventional honeycomb heater.
Figure 10:
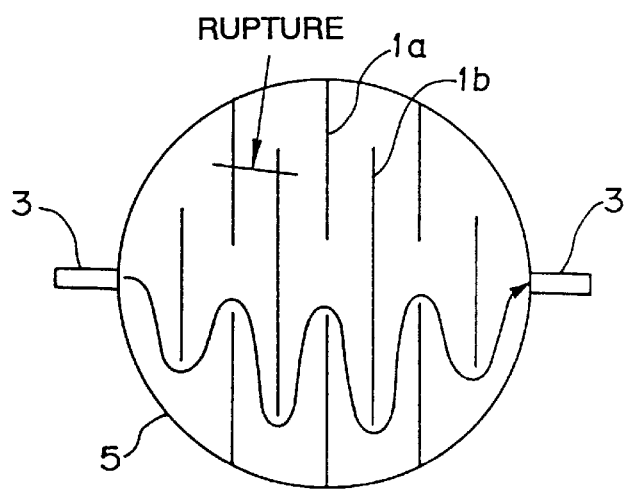
FIG. 10 a drawing showing a state in which rupture has occurred in part of a honeycomb heater according to the present invention.

In the honeycomb heater of the present invention, the total resistance is small and current concentration in the vicinity of each slit end can be relaxed, as mentioned above. Further, there is the following advantage. That is, in a conventional honeycomb heater with slits as shown in FIG. 9, when rupture takes place at one place between slits owing to the vibration during use, repeated electrification, etc., no heat is generated in any portion of the honeycomb heater; in contrast, in the present honeycomb heater as shown in FIG. 10, even when rupture takes place at one place between slits and one circuit is broken, if other circuit has no problem, the honeycomb heater can function although insufficiently.

In the present honeycomb heater, the electroconductive material constituting the honeycomb structure can be any of metals (e.g. ferrite type stainless steel and austenite type stainless steel), ceramics (e.g. perovskite type and SiC type), etc. Of these, ferrite type stainless steel is most preferred in view of the heat resistance and thermal shock resistance.

The honeycomb structure may be produced by windingup of metal foil or by powder metallurgy and extrusion, but the latter method is preferred for sufficient structural durability to avoid, in particular, a telescope phenomenon under severe conditions.

The sectional shape (cell shape) of the passages is not particularly restricted and can be an arbitrary shape selected from a polygonal (e.g. square or hexagonal) shape, a circular shape, a corrugated shape, etc.; however, a flexible cell shape (e.g. a hexagonal shape) capable of relaxing the thermal stress applied is preferred in view of the thermal shock resistance to be possessed by the passages.

Next, description is made on an example of the process for production of the honeycomb structure used in the present invention, particularly, a metallic honeycomb structure.

First, a material metal powder is prepared using, for example, a Fe powder, an Al powder and a Cr powder, or a powder of an alloy thereof so that they give a desired composition. The material metal powder is then mixed with an organic binder (e.g. methyl cellulose or polyvinyl alcohol) and water. The resulting mixture is subjected to extrusion to obtain a honeycomb body of desired shape.

In the above mixing, it is preferable that the material metal powder is mixed with an antioxidant (e.g. oleic acid) before being mixed with an organic binder and water, or that a material metal powder processed so as to have oxidation resistance is used.

The honeycomb body is fired at 1,000°–1,400° C. in a non-oxidizing atmosphere. Use of a non-oxidizing atmosphere containing hydrogen is preferable because the organic binder is decomposed and removed by the help of the catalytic action of Fe, etc. and, as a result, an excellent sintered honeycomb body is obtained.

When the firing temperature is lower than 1,000° C., the honeycomb body is not sintered. When the firing temperature is higher than 1,400° C., the sintered body obtained is deformed.

Preferably, the surfaces of the partition walls and pores of the sintered honeycomb body are coated with a heat-resistant metal oxide. The coating of the surfaces with a heat-resistant metal oxide is preferably conducted by one of the following methods.

(1) A sintered honeycomb body is heat-treated in an oxidizing atmosphere at 700°–1,100° C.

(2) Al or the like is plated (e.g. gas-phase plating) on the surfaces of the partition walls and pores of a sintered honeycomb body, followed by heat treatment in an oxidizing atmosphere at 700°–1,100° C.

(3) A sintered honeycomb body is dipped in a metal melt of Al or the like, followed by heat treatment in an oxidizing atmosphere at 700°–1,100° C.

(4) An alumina sol or the like is coated on the surfaces of the partition walls and pores of a sintered honeycomb body, followed by heat treatment in an oxidizing atmosphere at 700°–1,100° C.

Incidentally, the heat treatment temperature is preferably 900°–1,100° C. in view of the heat resistance and oxidation resistance.

Formation of slits in the honeycomb structure produced by the above-mentioned extrusion method may be conducted after the firing of the honeycomb body, but is preferably conducted before the firing because slits are formed easily and defects such as cell breakage and the like are less likely to appear. Formation of slits can be conducted, for example, by grinding using a diamond saw.

To the honeycomb structure are fitted electrodes for electrification of the structure, by brazing, welding or the like. The electrodes are generally connected to an electric source such as battery, capacitor or the like via a switch or a controlling device.

When the honeycomb heater of the present invention is used in an exhaust gas purification system for automobiles, etc., it is preferable that a catalyst layer containing a substance having a catalytic activity is loaded, by coating, on the partition walls of the honeycomb heater. The catalyst layer on the partition walls causes ignition when electrified and the reaction heat generated thereby accelerates the heating of the catalyst on the honeycomb heater or the light-off catalyst or main catalyst generally provided downstream of the honeycomb heater; thus, favorable purification ability is exhibited with a small electric power applied.

The catalyst layer loaded on the partition walls of the honeycomb structure by coating comprises a carrier having a large surface area and a substance having a catalytic activity, loaded thereon. Typical examples of the carrier having a large surface area are $\gamma$-$Al_2O_3$, $TiO_2$, $Sio_2$—$Al_2O_3$ and perovskite. Examples of the substance having a catalytic activity are noble metals (e.g. Pt, Pd and Rh) and base metals (e.g. Cu, Ni, Cr and Co). A preferable catalyst layer comprises $\gamma$-$Al_2O_3$ (a carrier) and a noble metal (Pt, Pd or Rh) or a desired combination of these noble metals, loaded on the carrier.

The present invention is hereinafter described specifically by way of Examples. However, the present invention is not restricted to these Examples.

[Example]

As shown in FIG. 1, slits 1a and 1b were made in a honeycomb structure 5 made of an electroconductive material, having a diameter of 80 mm, a thickness of 12 mm, a hexagonal cell shape, a rib thickness of 4 mil and a cell density of 450 cells/in.$^2$, so that two parallel circuits were formed in the honeycomb structure. The slits were made so that the total resistance of the honeycomb structure became 50 m$\Omega$ [this resistance was appropriate for use of the structure with a battery (an electric source) in automobiles] and the number of cells between two adjacent slits was constant (the cell number was always 4). Then, two electrode bolts were welded onto the circumference of the honeycomb structure to obtain a honeycomb heater.

[Comparative Example]

As shown in FIG. 6, slits 1 were made in the same honeycomb structure 5 as used in Example, alternately from the two opposing circumferences of the honeycomb structure so that a single circuit was formed in the structure. The slits were made so that the total resistance of the honeycomb structure became 50 m$\Omega$ (this resistance was the same as in Example) and the number of cells between two adjacent slits was constant (the cell number was always 8 which was two times that of Example). Then, two electrode bolts were welded onto the circumference of the honeycomb structure to obtain a honeycomb heater.

[Evaluation for durabilities to repeated electrification]

The honeycomb heaters obtained in Example and Comparative Example were examined for durability to repeated electrification by the following method.

Each honeycomb heater was electrified by feeding an electric power of 2.5 kW; electrification was stopped when the temperature of the center of the honeycomb structure reached 500° C.; then, air cooling was conducted until the temperature of the honeycomb structure center came down to 80° C.; and electrification was started again. This cycle was repeated until cell rupture occurred. The number of cycles up to the first cell rupture was measured.

As a result, in the honeycomb heater obtained in Comparative Example, cell rupture occurred within 20,000 cycles; in the honeycomb heater obtained in Example, 50,000 cycles or more were needed up to the first cell rupture. Further, in the honeycomb heater obtained in Example, even when cell rupture occurred in one place as shown in FIG. 10, one of the two circuits could be electrified and the function of heater could be utilizable partially.

As is clear from the above result, in producing a honeycomb heater with slits, having a predetermined total resistance, a honeycomb heater having parallel circuits, according to the present invention (as shown in FIG. 1), as compared with a conventional honeycomb heater (as shown in FIG. 6), can have cells of smaller number between adjacent slits and can have excellent durability to repeated electrification.

As described above, in the present honeycomb heater, slits are made in the honeycomb structure so that parallel circuits are formed in the structure; thereby, the number of cells between adjacent slits can be made small (or, the distance between adjacent slits can be made small) while the total resistance of the structure is kept low. As a result, current concentration in the vicinity of each slit end is relaxed and the durability to repeated electrification is excellent.

What is claimed is:

1. A honeycomb heater comprising
   a single piece honeycomb structure made of an electroconductive material, the honeycomb structure having slits for resistance adjustment and
   electrodes fitted thereto for electrification thereof, wherein said slits are formed in the honeycomb structure in such a manner that parallel electric circuits are formed in the honeycomb structure upon electrification of the structure.

2. A honeycomb heater according to claim 1, wherein slits each with one end reaching the circumference of the honeycomb structure and other end not reaching the circumference of the honeycomb structure and slits each with both ends not reaching the circumference of the honeycomb structure are used in combination to form parallel electric circuits in the honeycomb structure.

3. A honeycomb heater according to claim 1, wherein the honeycomb structure is loaded with a catalyst layer by coating.

4. A honeycomb heater according to claim 1, wherein the electroconductive material constituting the honeycomb structure is ferrite type stainless steel.

5. A honeycomb heater according to claim 3, wherein the catalyst layer comprises $\gamma\text{-}Al_2O_3$ and at least one noble metal selected from Pt, Pd and Rh.

* * * * *